United States Patent
Lu et al.

(10) Patent No.: US 11,159,997 B2
(45) Date of Patent: Oct. 26, 2021

(54) COMMUNICATION METHOD AND APPARATUS (71) Applicant: HUAWEI TECHNOLOGIES CO., LTD., Guangdong (CN)

(72) Inventors: Wei Lu, Shanghai (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 195 days.

(21) Appl. No.: 16/551,196

(22) Filed: Aug. 26, 2019

(65) Prior Publication Data
US 2019/0380074 A1  Dec. 12, 2019

Related U.S. Application Data (63) Continuation of application No. PCT/CN2017/075042, filed on Feb. 27, 2017.

(51) Int. Cl.
*H04W 36/02* (2009.01)
*H04W 36/08* (2009.01)

(52) U.S. Cl.
CPC .......... *H04W 36/023* (2013.01); *H04W 36/08* (2013.01)

(58) Field of Classification Search
CPC ..................... H04W 36/023; H04W 36/08
See application file for complete search history.

(56) References Cited

U.S. PATENT DOCUMENTS

| 2007/0213060 | A1 | 9/2007 | Shaheen | |
|---|---|---|---|---|
| 2009/0061876 | A1* | 3/2009 | Ho | H04W 99/00 455/436 |
| 2011/0013593 | A1* | 1/2011 | Hapsari | H04W 36/02 370/331 |
| 2012/0106560 | A1 | 5/2012 | Gumaste | |

(Continued)

FOREIGN PATENT DOCUMENTS

| CN | 101047967 A | 10/2007 |
|---|---|---|
| CN | 101272607 A | 9/2008 |

(Continued)

OTHER PUBLICATIONS

Huawei,"Handover enhancement for dual connectivity",3GPP TSG-RAN WG3 Meeting #89 R3-151413,Beijing, China, Aug. 24-28, 2015,Total 14 Pages.

*Primary Examiner* — Hassan Kizou
*Assistant Examiner* — Hector Reyes
(74) *Attorney, Agent, or Firm* — Womble Bond Dickinson (US) LLP (57) ABSTRACT

A communication method and an apparatus are disclosed. The method includes: receiving, by a target access network device, at least one first packet of a terminal when the terminal is handed over from a source access network device to the target access network device; buffering the at least one first packet; and sending the at least one buffered first packet to the terminal when the target access network device receives a second packet and a third packet from the source access network device, or the target access network device receives one of the second packet and the third packet and does not receive the other one of the second packet and the third packet within a preset period, or the target access network device does not receive the second packet or the third packet within the preset period.

6 Claims, 6 Drawing Sheets

(56) References Cited

U.S. PATENT DOCUMENTS

| | | | |
|---|---|---|---|
| 2012/0177002 A1* | 7/2012 | Faucher | H04W 36/02 370/331 |
| 2012/0294277 A1* | 11/2012 | Jaiswal | H04W 36/023 370/331 |
| 2012/0314689 A1 | 12/2012 | Wang | |
| 2013/0058308 A1* | 3/2013 | Jaiswal | H04L 47/34 370/331 |
| 2013/0079016 A1 | 3/2013 | Wu et al. | |
| 2016/0014650 A1* | 1/2016 | Laganier | H04W 36/00837 370/331 |
| 2016/0127959 A1 | 5/2016 | Miao et al. | |
| 2017/0245184 A1* | 8/2017 | Nagesh Shetigar | H04W 36/023 |
| 2018/0035339 A1* | 2/2018 | Mitsui | H04W 72/04 |
| 2019/0090167 A1 | 3/2019 | Lu et al. | |
| 2019/0090169 A1 | 3/2019 | Lu et al. | |

FOREIGN PATENT DOCUMENTS

| | | | |
|---|---|---|---|
| CN | 101365239 A | 2/2009 | |
| CN | 101572929 A | 11/2009 | |
| CN | 101938794 A | 1/2011 | |
| CN | 102438284 A | 5/2012 | |
| EP | 2187664 B1 | 6/2014 | |
| EP | 2981133 A1 | 2/2016 | |
| EP | 3073661 A1 | 9/2016 | |
| EP | 2451211 B1 | 8/2017 | |
| WO | WO-2009070576 A2 * | 6/2009 | H04L 1/1841 |
| WO | 2014157518 A1 | 10/2014 | |
| WO | 2015009075 A1 | 1/2015 | |
| WO | 2017197564 A1 | 11/2017 | |
| WO | 2017197565 A1 | 11/2017 | |

* cited by examiner

COMMUNICATION METHOD AND APPARATUS

CROSS-REFERENCE TO RELATED APPLICATIONS

This application is a continuation of International Application No. PCT/CN2017/075042, filed on Feb. 27, 2017, the disclosure of which is hereby incorporated by reference in its entirety.

TECHNICAL FIELD

Embodiments of the present disclosure relate to the communications field, and in particular, to a communication method and an apparatus.

BACKGROUND

To enhance service experience of a user, a local routing device and a local network device (for example, a local application server) may be deployed near an access network. The local routing device may obtain a packet of a terminal, and route the packet to the local application server after processing the packet. The local routing device may also be referred to as a user plane function device, and is a user plane function device close to the access network or the terminal device.

In a process of handing over a terminal from a source evolved NodeB (eNB, or eNodeB) to a target eNB, within a period of time, two transmission channels may coexist between a local routing device and the terminal: a transmission channel 1: the local routing device→the source eNB→the target eNB→the terminal; and a transmission channel 2: the local routing device→the target eNB→the terminal. Transmission time of packets on the two transmission channels is different, resulting in disorder of packets received by the terminal.

SUMMARY

Embodiments of the present disclosure provide a communication method and an apparatus, to avoid disorder of packets received by a terminal when the terminal is handed over between access network devices.

According to a first aspect, an embodiment of the present disclosure provides a communication method. The communication method includes:

receiving, by a target access network device, at least one first packet of a terminal when the terminal is handed over from a source access network device to the target access network device;

buffering, by the target access network device, the at least one first packet; and sending the at least one buffered first packet to the terminal when the target access network device receives a second packet and a third packet from the source access network device, or the target access network device receives one of the second packet and the third packet and does not receive the other one of the second packet and the third packet within a preset period, or the target access network device does not receive the second packet or the third packet, where the second packet and the third packet are end identification packets.

It should be understood that the end identification packet is a packet sent by the terminal after actually applied packets are all sent. If the end identification packet is received, it may indicate that all actually applied packets of the terminal have been sent. A format of the end identification packet is not limited. For example, the end identification packet may be an end marker packet. Alternatively, identification information is added to the last actually applied packet.

The second packet carries first identification information, and the first identification information is used to identify that the second packet is sent by a core network device; and/or the third packet carries second identification information, and the second identification information is used to identify that the third packet is sent by a local routing device.

It should be understood that specific forms of the first identification information and the second identification information are not limited in this embodiment of the present disclosure. For example, the first identification information and the second identification information may be device identifiers of the devices sending the second packet and the third packet, or may be other information that can identify the devices.

In other words, the second packet is an end identification packet sent by the core network device, and the third packet is an end identification packet sent by the local routing device.

A data channel on which the local routing device and the core network device send packets to the terminal through the source access network device and the target access network device may be referred to as a source data transmission channel. A channel on which the local routing device and the core network device send packets to the terminal directly through the target access network device may be referred to as a target data transmission channel.

If the target access network device receives an end identification packet transmitted through the source data transmission channel, or if a target access network does not receive, within the preset period, an end identification packet sent by the core network device or the local routing device through the source data transmission channel, it indicates that data transmission on the source data transmission channel has ended. Sending time of a packet reaching the target access network device through the source data transmission channel is earlier than that of a packet reaching the target access network device through the target data transmission channel. Therefore, a packet transmitted through the target data transmission channel is sent to the terminal after data transmission on the source data transmission channel has ended, so that disorder of packets received by the terminal can be avoided.

In some embodiments, the first identification information is carried in an end marker of the second packet, and the second identification information is carried in an end marker of the third packet.

In some embodiments, the communication method further includes:

sending, by the target access network device, a notification message to the local routing device, where the notification message is used to instruct the local routing device to send the third packet to the source access network device.

The third packet is used to identify that all of the actually applied packets of the terminal have been sent.

In some embodiments, the communication method may further include:

starting, by the target access network device, a timer.

In one embodiment, the target access network device may start the timer after receiving the second packet from the source access network device. In this way, if the target access network device does not receive the third packet within a preset period of the timer after receiving the second packet, the target access network device sends the at least one buffered first packet to the terminal.

In one embodiment, the target access network device may start the timer after sending a path switch request message to a mobility management network element or a control plane function device.

According to a second aspect, an embodiment of the present disclosure provides a communication method. The communication method includes:

receiving, by a target access network device, a first packet of a terminal when the terminal is handed over from a source access network device to the target access network device, where the first packet carries first identification information, and the first identification information is used to identify a device sending the first packet;

buffering, by the target access network device, the first packet; and sending the buffered first packet to the terminal when the target access network device receives, from the source access network device, a second packet of the terminal that is sent by the device sending the first packet, or the target access network device does not receive the second packet within a preset period, where the second packet is an end identification packet, the second packet carries second identification information, and the second identification information identifies the device sending the second packet.

It should be understood that specific forms of the first identification information and the second identification information are not limited in this embodiment of the present disclosure. For example, the first identification information and the second identification information may be device identifiers of the device sending the first packet and the second packet, or may be other information that can identify the device.

A data channel on which a local routing device or a core network device sends a packet to the terminal through the source access network device and the target access network device may be referred to as a source data transmission channel. A channel on which the local routing device or the core network device sends a packet to the terminal directly through the target access network device may be referred to as a target data transmission channel.

If the target access network device receives an end identification packet transmitted through the source data transmission channel, or if a target access network does not receive, within the preset period, an end identification packet sent by the core network device or the local routing device through the source data transmission channel, it indicates that data transmission on the source data transmission channel has ended. Sending time of a packet reaching the target access network device through the source data transmission channel is earlier than that of a packet reaching the target access network device through the target data transmission channel. Therefore, a packet transmitted through the target data transmission channel is sent to the terminal after data transmission on the source data transmission channel has ended, so that disorder of packets received by the terminal can be avoided.

In some embodiments, the second identification information is carried in an end marker of the second packet.

In some embodiments, the communication method may further include:

starting, by the target access network device, a timer.

According to a third aspect, an embodiment of the present disclosure provides a communication method. The communication method includes:

receiving, by a local routing device, a notification message, where the notification message is used to instruct the local routing device to send an end identification packet, the end identification packet carries identification information, and the identification information is used to identify that the end identification packet is sent by the local routing device; and sending, by the local routing device, the end identification packet based on the notification message.

The end identification packet is used to indicate that all of actually applied packets of the terminal have been sent.

The local routing device may learn, based on the notification message, that the terminal is handed over from a source access network device to a target access network device.

In one embodiment, the local routing device sends, based on the notification message, the end identification packet to the target access network device through the source access network device.

A data channel on which the local routing device sends a packet to the terminal through the source access network device and the target access network device may be referred to as a source data transmission channel. A channel on which the local routing device sends a packet to the terminal directly through the target access network device may be referred to as a target data transmission channel.

The local routing device sends the end identification packet to the target access network device through the source data transmission channel, so that the target access network device can learn that data transmission on the source data transmission channel has ended.

In some embodiments, the identification information is carried in an end marker of the end identification packet.

According to a fourth aspect, an embodiment of the present disclosure provides an access network device. The access network device has a function of implementing behavior of the target access network device in the method according to the first aspect. The function may be implemented by hardware, or may be implemented by hardware executing corresponding software. The hardware or software includes one or more modules corresponding to the foregoing function.

In some embodiments, the access network device includes a communications unit and a storage unit. The communications unit is configured to support communication between the access network device and another device. The storage unit is configured to buffer a received packet. In an example, the communications unit may be a communications interface, and the storage unit may be a memory.

According to a fifth aspect, an embodiment of the present disclosure provides an access network device. The access network device has a function of implementing behavior of the target access network device in the method according to the second aspect. The function may be implemented by hardware, or may be implemented by hardware executing corresponding software. The hardware or software includes one or more modules corresponding to the foregoing function.

In some embodiments, the access network device includes a communications unit and a storage unit. The communications unit is configured to support communication between the access network device and another device. The storage unit is configured to buffer a received packet. In an example, the communications unit may be a communications interface, and the storage unit may be a memory.

According to a sixth aspect, an embodiment of the present disclosure provides a local routing device. The local routing device has a function of implementing behavior of the local routing device in the method according to the third aspect. The function may be implemented by hardware, or may be implemented by hardware executing corresponding software. The hardware or software includes one or more modules corresponding to the foregoing function.

In some embodiments, the local routing device includes a communications unit. The communications unit is configured to support communication between the local routing device and another device. In one embodiment, the local routing device may further include a storage unit. The storage unit is configured to store a program instruction and data that are necessary to the local routing device. In an example, the communications unit may be a communications interface, and the storage unit may be a memory.

According to a seventh aspect, an embodiment of the present disclosure provides a computer-readable storage medium. The computer-readable storage medium stores an instruction. When the instruction is run on an access network device, the access network device is enabled to perform the method according to the first aspect.

According to an eighth aspect, an embodiment of the present disclosure provides a computer-readable storage medium. The computer-readable storage medium stores an instruction. When the instruction is run on an access network device, the access network device is enabled to perform the method according to the second aspect.

According to a ninth aspect, an embodiment of the present disclosure provides a computer-readable storage medium. The computer-readable storage medium stores an instruction. When the instruction is run on a local routing device, the local routing device is enabled to perform the method according to the third aspect.

According to a tenth aspect, an embodiment of the present disclosure provides a computer program product including an instruction. When the computer program product is run on an access network device, the access network device is enabled to perform the method according to the first aspect.

According to an eleventh aspect, an embodiment of the present disclosure provides a computer program product including an instruction. When the computer program product is run on an access network device, the access network device is enabled to perform the method according to the second aspect.

According to a twelfth aspect, an embodiment of the present disclosure provides a computer program product including an instruction. When the computer program product is run on a local routing device, the local routing device is enabled to perform the method according to the third aspect.

DESCRIPTION OF EMBODIMENTS

The following describes the technical solutions in the embodiments of the present disclosure with reference to the accompanying drawings in the embodiments of the present disclosure.

A network architecture and a service scenario that are described in the embodiments of the present disclosure are used to describe the technical solutions in the embodiments of the present disclosure more clearly, but do not limit the technical solutions provided in the embodiments of the present disclosure. A person of ordinary skill in the art may know that the technical solutions provided in the embodiments of the present disclosure are also applicable to similar technical problems as the network architecture evolves and a new service scenario appears.

In the embodiments of the present disclosure, nouns "network" and "system" are usually interchangeably used, but meanings of the nouns may be understood by a person skilled in the art. A terminal in the embodiments of the present disclosure may include various handheld devices, in-vehicle devices, wearable devices, or computing devices that have a radio communication function or other processing devices connected to a wireless modem, and various forms of user equipment (UE), mobile stations (MS), terminal devices, and the like. For ease of description, the devices mentioned above are collectively referred to as a terminal. An access network device in the embodiments of the present disclosure may be a base station (BS). The base station is an apparatus that is deployed in a radio access network and that is configured to provide a wireless communication function for the terminal. The base station may include macro base stations, micro base stations, relay stations, access points, and the like in various forms. In systems using different radio access technologies, names of a device having a function of a base station may vary. For example, the device is referred to as an evolved NodeB (eNB or eNodeB) in a long term evolution (LTE) system, referred to as a NodeB in a 3G communications system, referred to as an AN (Access Network), access network in a 5G communications system, and so on.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
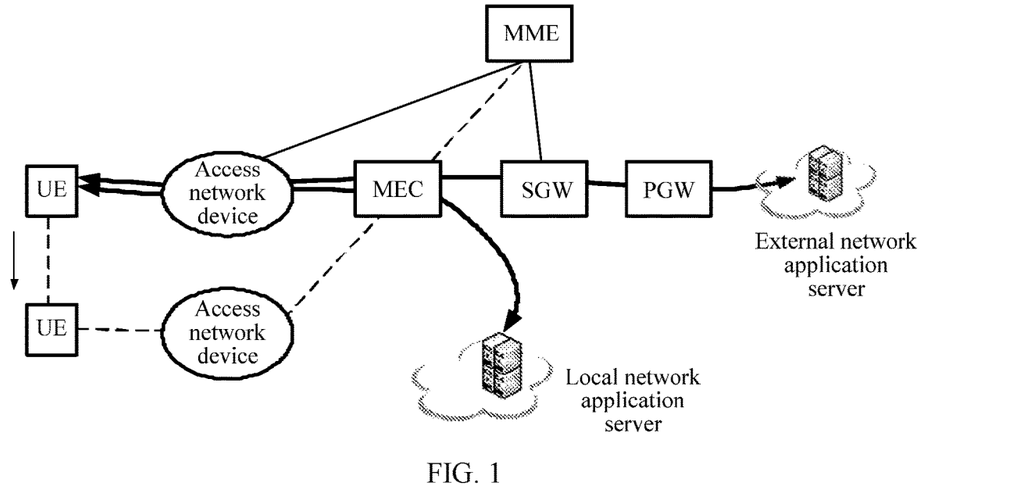
FIG. 1 is a schematic diagram of a possible application scenario according to an embodiment of the present disclosure.
Figure 2:
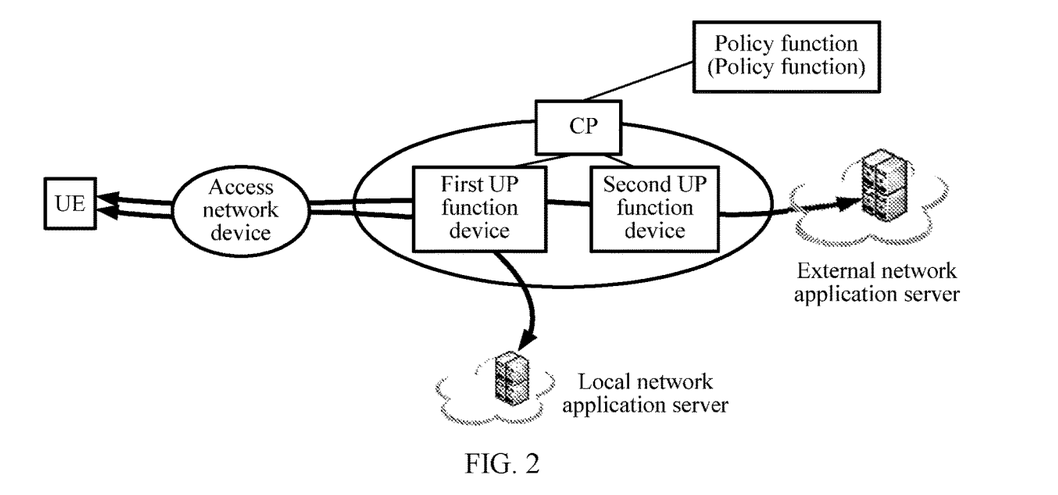
FIG. 2 is a schematic diagram of another possible application scenario according to an embodiment of the present disclosure.

The embodiments of the present disclosure may be applied to system architectures shown in FIG. 1 and FIG. 2.

In the system architecture shown in FIG. 1, a mobile edge computing (MEC) device, used as a local routing device, may directly route a data stream to a local application server, and does not need to route the data stream to an application server on a core network side through core network devices (for example, an SGW and a PGW) any longer. In such a processing manner, a transmission path of the data stream can be shortened, and therefore a processing speed of applying the data stream can be increased.

In the system architecture shown in FIG. 2, a first user plane function device, used as a local routing device, may route a packet to a local network device, so that the packet does not need to reach an application server on a core network side through a core network device (for example, a second user plane function device) any longer. A control plane (CP) function device, similar to an MME in the system architecture shown in FIG. 1, is mainly configured to implement a control function. Specifically, the CP function device may be an access and mobility management function (AMF) device or a session management function (SMF) device. For ease of description, the CP function device is used for illustration in this specification. The first user plane (User Plane, UP) function device is configured to implement a user plane function of a local network, and may be referred to as a local routing function device, similar to the MEC device in the system architecture shown in FIG. 1. A specific device name is not limited. The second user plane function device is configured to implement a user plane function of a core network, similar to user plane functions of the SGW and the PGW in the embodiment shown in FIG. 1, and may be referred to as the core network device. A specific device name is not limited. The local routing device and the core network device are relative to each other, and may respectively be different user plane function devices.

Figure 3:
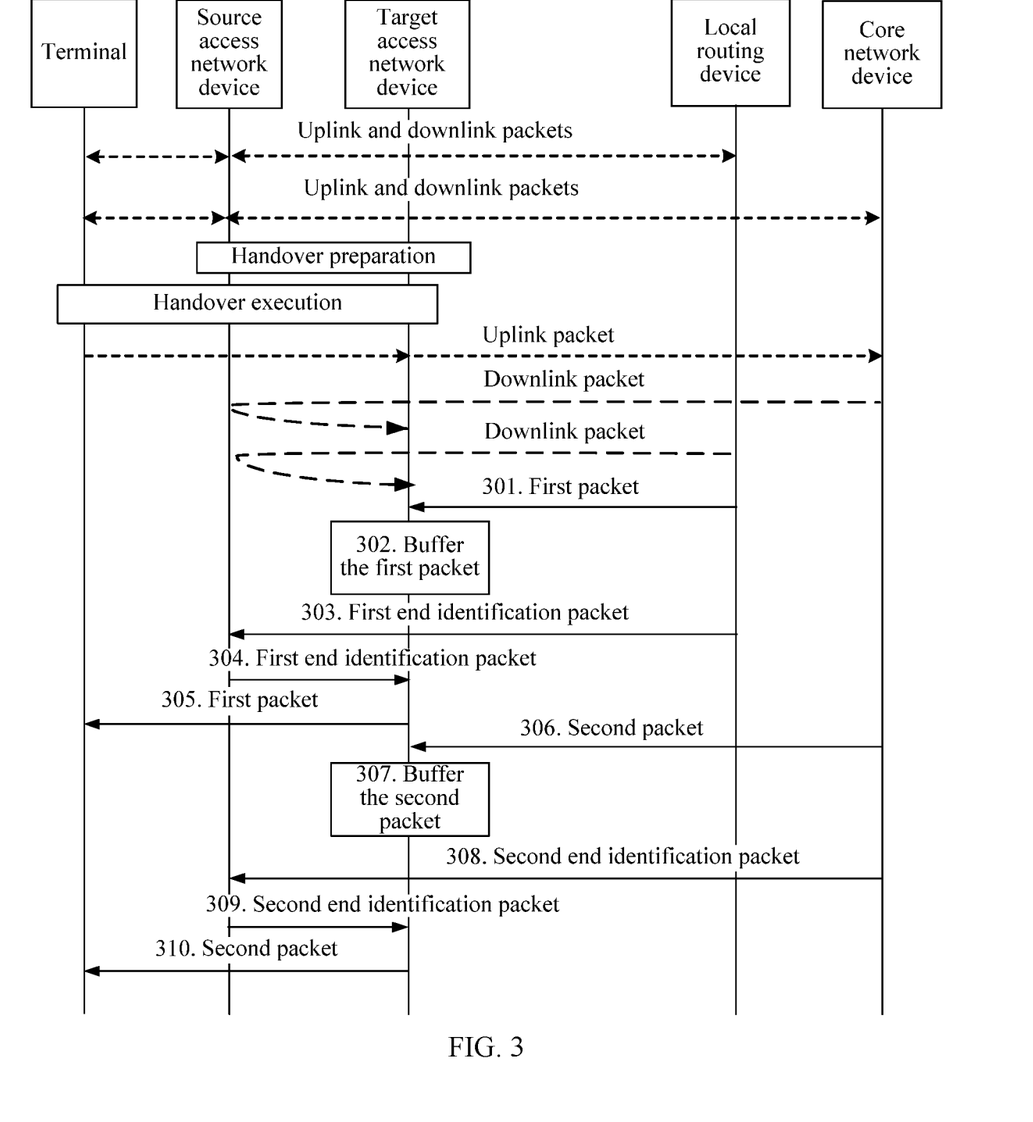
FIG. 3 is a schematic flowchart of a communication method according to an embodiment of the present disclosure.

FIG. 3 is a schematic flowchart of a communication method 300 according to an embodiment of the present disclosure.

Before a process of handing over a terminal from a source access network device to a target access network device is completed, a local routing device or a core network device sends a packet to the terminal through the source access network device. After the handover is completed, the local routing device or the core network device sends a packet to the terminal through the target access network device.

For a preparation process of the handover between the source access network device and the target access network device and an execution process of the handover of the terminal between the source access network device and the target access network device, refer to the prior art. After the handover between the source access network device and the target access network device is completed, and before a data transmission channel between a target access network and the core network device (for example, a gateway device or a user plane function device of the core network) is established, if the source access network device still receives a packet of the terminal that is sent by the local routing device, the source access network device needs to send the packet to the target access network device. To be specific, within a period of time within which the terminal is handed over to the target access network device, two data transmission channels may exist between the local routing device and the terminal: a data transmission channel 1: the local routing device--->the source access network device--->the target access network device--->the terminal; and a data transmission channel 2: the local routing device--->the target access network device--->the terminal, as shown by dashed lines in FIG. 3.

As shown in FIG. 3, the communication method 300 includes the following content.

Operation 301. The local routing device sends a first packet to the target access network device after determining that the terminal is handed over from the source access network device to the target access network device.

The local routing device may determine, in a plurality of manners, that the terminal is handed over from the source access network device to the target access network device.

In one embodiment, the local routing device may determine, by using control layer signaling between the target access network device and the local routing device, that the source access network device is switched to the target access network device. For example, the local routing device may receive, from the target access network device, a message used to update address information that is of an access network device and that is stored in the local routing device, and determine, based on the message, that the terminal is handed over.

In one embodiment, the local routing device may determine, by using control layer signaling between the core network device (for example, an SGW) and the local routing device, that the source access network device is switched to the target access network device. For example, the local routing device may receive, from the core network device, a message used to update address information that is of an access network device and that is stored in the local routing device, and determine, based on the message, that the terminal is handed over.

In one embodiment, the local routing device may further detect control layer signaling between an MME/CP and the core network device, and determine, based on the control layer signaling, that the terminal is handed over. For example, the control layer signaling may be a bearer modification request message sent by the MME/CP to the core network device, or a bearer modification response message sent by the core network device to the MME/CP.

In one embodiment, the local routing device may further detect whether the core network device sends an end marker packet, and if the core network device sends the end marker packet, determines that the terminal is handed over.

It should be understood that in this embodiment of the present disclosure, the local routing device may further determine, in another manner, that the terminal is handed over.

It should be noted that the local routing device may trigger process 304 after determining that the terminal device is handed over from the source access network device to the target access network device. In some embodiments, if the local routing device receives a message that can directly or indirectly enable the local routing device to trigger process 304, it may be considered that the local routing device determines that the terminal is handed over from the source access network device to the target access network device.

Operation 302. The target access network device buffers the first packet after receiving the first packet.

The target access network device may receive packets transmitted through both the data transmission channel 1 and the data transmission channel 2, and sending time of a packet transmitted through the data transmission channel 1 is earlier. Therefore, a first packet transmitted through the data transmission channel 2 is buffered, and a packet received from the source access network device is first sent, so that disorder of packets received by the terminal can be avoided.

Operation 303. A local routing node sends a first end identification packet to the source access network device. The first end identification packet indicates that data transmission on the data transmission channel 1 ends. A specific expression form of the first end identification packet is not limited. For example, the first end identification packet may be an end marker packet.

Operation 304. The source access network device sends the first end identification packet to the target access network device.

Operation 305. The target access network device sends the buffered first packet to the terminal.

After receiving the first end identification packet, the target access network device can determine that transmission of all packets transmitted through the data transmission channel 1 has been completed. In this case, the target access network device sends, to the terminal, a packet transmitted through the data transmission channel 2, so that disorder of packets received by the terminal can be avoided.

Similarly, after the process of the handover between the source access network device and the target access network device is completed, and before a data transmission channel between the core network device and the target access network device is established, if the source access network device still receives a packet of the terminal that is sent by the core network device, the source access network device needs to send the packet to the target access network device. To be specific, within a period of time within which the terminal is handed over to the target access network device, two data transmission channels may exist between the core network device and the terminal: a data transmission channel 3: the core network device--->the source access network device--->the target access network device--->the terminal; and a data transmission channel 4: the core network device--->the target access network device--->the terminal, as shown by dashed lines in FIG. 3.

Correspondingly, the method 300 may further include content described in processes 306 to 310.

Operation 306. The core network device sends a second packet to the target access network device after determining that the terminal is handed over from the source access network device to the target access network device.

The core network device may determine, in a plurality of manners, that the terminal is handed over from the source access network device to the target access network device. This is not limited in this embodiment of the present disclosure.

For example, after the terminal is handed over from the source access network device to the target access network device, the target access network device may send a path switch request message to the MME/CP. The MME/CP sends a bearer modification request message to the core network device after receiving the path switch request message sent by the target access network device. The core network device may determine, based on the bearer modification request message, that the terminal is handed over from the source access network device to the target access network device.

The core network device may trigger process 310 after determining that the terminal is handed over from the source access network device to the target access network device. To be specific, the core network device sends a second end identification packet after data transmission on the data transmission channel 3 ends. In some embodiments, all processes that can directly or indirectly enable the core network device to send the second end identification packet may be regarded as processes in which the core network determines that the terminal is handed over from the source access network device to the target access network device. A specific expression form is not limited.

Operation 307. The target access network device buffers the second packet after receiving the second packet.

The target access network device may receive packets transmitted through both the data transmission channel 3 and the data transmission channel 4, and sending time of a packet transmitted through the data transmission channel 3 is earlier. Therefore, a second packet transmitted through the data transmission channel 4 is buffered so that disorder of packets received by the terminal can be avoided.

Operation 308. The core network device sends a second end identification packet to the source access network device.

Operation 309. The source access network device sends the second end identification packet to the target access network device.

Operation 310. The target access network device sends the buffered second packet to the terminal.

After receiving the second end identification packet, the target access network device can determine that transmission of all packets transmitted through the data transmission channel 3 has been completed. In this case, a packet transmitted through the data transmission channel 4 is sent to the terminal, so that disorder of packets received by the terminal can be avoided.

It should be noted that sequence numbers of the foregoing processes do not mean an execution sequence. The execution sequence of the processes should be determined according to functions and internal logic of the processes, and shall not be construed as any limitation on the implementation process of this embodiment of the present disclosure.

It should be understood that in this embodiment of the present disclosure, processes 305 and 310 may be independently performed. To be specific, the target access network device may send the buffered first packet to the terminal after receiving the end identification packet sent by the local routing device, and send the buffered second packet to the terminal after receiving the end identification packet sent by the core network device. In this embodiment of the present disclosure, the target access network device needs to identify whether a received packet and a received end identification packet are sent by the local routing device or the core network device. In one embodiment, in this embodiment of the present disclosure, the second packet sent by the core network device carries identification information used to identify that the second packet is sent by the core network device, and the second end identification packet sent by the core network device carries identification information used to identify that the second end identification packet is sent by the core network device; and/or the first packet sent by the local routing device carries identification information used to identify that the first packet is sent by the local routing device, and the first end identification packet sent by the local routing device carries identification information used to identify that the first end identification packet is sent by the local routing device. For example, the local routing node may further process the sent first packet and the sent first end identification packet, so that the first packet is distinguished from the second packet, and the first end identification packet is distinguished from the second end identification packet. Specifically, in this embodiment of the present disclosure, specific expression forms of the first end identification packet and the second end identification packet are not limited. All expression forms that can distinguish the first end identification packet from the second end identification packet fall within the scope of this embodiment of the present disclosure.

In one embodiment, an end marker of the first end identification packet or the second end identification packet includes the identification information. For example, the end marker of the first end identification packet may be an end marker, and the end marker of the second end identification packet may be a local end marker. Alternatively, the end marker of the first end identification packet may be a CN end marker, and the end marker of the second end identification packet may be an MEC end marker. However, this embodiment of the present disclosure is not limited thereto. A device identifier may alternatively be carried in another part of an end identification packet.

It should be further understood that in some embodiments, a fault may occur on the data transmission channel 1 or the data transmission channel 3, so that the end identification packet sent by the local routing device or the core network device cannot reach the target access network device through the source access network device. In these scenarios, the target access network device possibly cannot receive, within a long time, the end identification packet sent by the local routing device or the core network device. If the target access network device can send a buffered packet to the terminal only after receiving of the two end identification packets sent by the local routing device and the core network device, the target access network device cannot send the buffered packet to the terminal. Therefore, in this embodiment of the present disclosure, the target access network device may further start a timer. When the timer expires, if the target access network device still does not receive the end identification packet sent by the local routing device or the core network device, the target access network device sends the buffered packet to the terminal. A moment at which the target access network starts the timer is not limited in this embodiment of the present disclosure. For example, the target access network device may start the timer after receiving the packet from the local routing device or the core network device, or may start the timer after sending the path switch request message to the MME/CP.

It should be further understood that in this embodiment of the present disclosure, processes 305 and 310 may be simultaneously performed after processes 304 and 309. To be specific, the target access network device sends the buffered first packet and the buffered second packet to the terminal after receiving the two end identification packets sent by the local routing device and the core network device. In this embodiment of the present disclosure, the first end identification packet sent by the local routing device carries the identification information used to identify that the packet is sent by the local routing device, and/or the second end identification packet sent by the core network device carries the identification information used to identify that the packet is sent by the core network device. In this way, after receiving an end identification packet, the target access network device can distinguish a device sending the end identification packet.

It should be further understood that in some embodiments, the access network device possibly cannot learn whether the local routing device is deployed in a current network. Alternatively, even if the local routing device is deployed, due to some reasons, for example, because subscription data of the terminal does not allow a data stream to be locally processed, the data stream of the terminal is not locally processed by the local routing device. Alternatively, a fault may occur on the data transmission channel 1, so that the end identification packet sent by the local routing device cannot reach the target access network device through the source access network device. In these scenarios, the target access network device possibly cannot receive, for a long time, the end identification packet sent by the local routing device. If the target access network device can send a buffered packet to the terminal only after receiving the two end identification packets sent by the local routing device and the core network device, the target access network device cannot send the buffered packet to the terminal. Therefore, in this embodiment of the present disclosure, the target access network device may further start a timer. When the timer expires, if the target access network device still does not receive the end identification packet sent by the local routing device, the target access network device sends the buffered packet to the terminal. A moment at which the target access network starts the timer is not limited in this embodiment of the present disclosure. For example, the target access network device may start the timer after receiving the end identification packet sent by the core network device, or may start the timer after sending the path switch request message to the MME/CP.

Application of the communication method 300 according to this embodiment of the present disclosure in the system architectures shown in FIG. 1 and FIG. 2 is described below with reference to FIG. 4 and FIG. 5.

Figure 4:
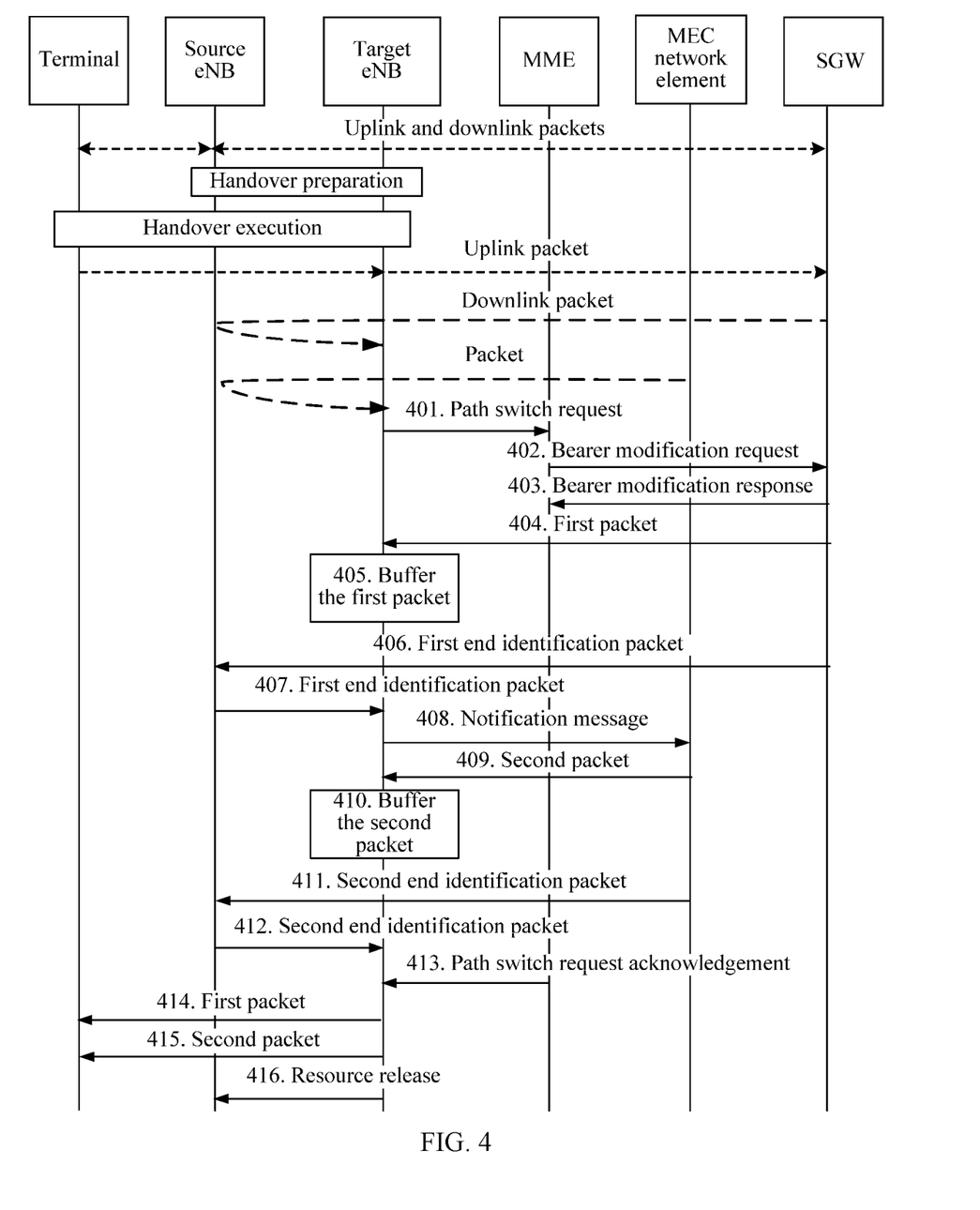
FIG. 4 is a schematic flowchart of another communication method according to an embodiment of the present disclosure.

FIG. 4 is a schematic flowchart of a communication method according to another embodiment of the present disclosure.

For a preparation process of a handover between a source eNB and a target eNB and an execution process of a handover of a terminal between the source eNB and the target eNB, refer to the prior art. After the handover of the terminal between the source eNB and the target eNB is performed, if the source eNB receives a packet of the terminal that is sent by an SGW or an MEC device, the packet needs to be sent to the target eNB.

To be specific, in this case, a downlink packet reaches the terminal through a data transmission channel 1, and the data transmission channel 1 is: the SGW--->the source eNB--->the target eNB--->the terminal; or the packet sent by the MEC device reaches the terminal through a data transmission channel 2, and the data transmission channel 2 is: the MEC device--->the source eNB--->the target eNB--->the terminal, as shown by dashed lines in FIG. 4.

Operation 401. The target eNB sends a path switch request message to an MME.

Operation 402. The MME sends a bearer modification request message to the SGW.

Operation 403. The SGW sends a bearer modification response message to the MME.

Processes 401 to 403 are the same as the prior art. Corresponding content is properly omitted herein.

Operation 404. The SGW sends a first packet of the terminal to the target eNB.

The SGW may learn, based on the received bearer modification request message, that the terminal is handed over from the source eNB to the target eNB. To be specific, a downlink packet may reach the terminal through a data transmission channel 3 in this case. The data transmission channel 3 is the SGW--->the target eNB--->the terminal.

Operation 405. The target eNB buffers the first packet.

The target eNB may simultaneously receive packets transmitted through the data transmission channel 1 and the data transmission channel 3, and sending time of a packet transmitted through the data transmission channel 1 is earlier. Therefore, a first packet transmitted through the data transmission channel 3 is buffered, and a packet received through the data transmission channel 1 is first sent to the terminal, so that disorder of packets received by the terminal can be avoided.

Operation 406. The SGW sends a first end identification packet to the source eNB.

Operation 407. The source eNB sends the first end identification packet to the target eNB, so that the eNB can sense that transmission of all packets transmitted through the data transmission channel 1 has been completed.

It should be understood that an execution sequence of processes 403, 404, and 406 is not limited. They may be simultaneously performed, or may be performed in any sequence.

Operation 408. The target eNB sends a notification message to the MEC device, where the notification message is used to notify the MEC device that the terminal is handed over from the source eNB to the target eNB. The notification process may enable the MEC device to trigger process 411. To be specific, after data transmission on the data transmission channel 2 ends, the MEC device is instructed to send a second end identification packet. In some embodiments, any message that is sent by the target eNB to the MEC device and that is used to directly or indirectly enable the MEC device to trigger process 411 may be regarded as the notification message.

For example, the notification message may include address information of the target eNB and identification information of the terminal device. The identification information of the terminal device is used to indicate a terminal that is handed over. After receiving the notification message, the MEC device may change stored address information of the source eNB to the address information of the target eNB.

It should be noted that a moment at which process 408 is performed is not limited in this embodiment of the present disclosure. Processes 408 and 401 may be simultaneously performed, or process 408 may be performed before or after process 401.

Operation 409. The MEC device sends a second packet to the target eNB.

The MEC device may learn, based on the received notification message, that the terminal is handed over from the source eNB to the target eNB. To be specific, the packet sent by the MEC device may reach the terminal through a data transmission channel 4 in this case. The data transmission channel 4 is: the MEC device--->the target eNB--->the terminal.

Operation 410. The target eNB buffers the second packet.

The target eNB may simultaneously receive packets transmitted through the data transmission channel 2 and the data transmission channel 4, and sending time of a packet transmitted through the data transmission channel 2 is earlier. Therefore, a second packet transmitted through the data transmission channel 4 is buffered so that disorder of packets received by the terminal can be avoided.

Operation 411. The MEC device sends a second end identification packet to the source eNB.

Operation 412. The source eNB sends the second end identification packet to the target eNB, to notify the target eNB that transmission of all packets transmitted through the data transmission channel 2 has been completed.

It should be understood that an execution sequence of processes 409 and 411 is not limited. They may be simultaneously performed, or may be performed in any sequence.

Operation 413. The MME sends a path switch request acknowledge message to the target eNB.

It should be understood that a moment at which process 413 is performed is not limited in this embodiment of the present disclosure. For example, process 413 may be performed after process 412 or process 403, or may be performed at any moment between process 403 and process 412.

Operation 414. The target eNB sends the buffered first packet to the terminal.

Operation 415. The target eNB sends the buffered second packet to the terminal.

In other words, the target eNB sends the buffered first packet and the buffered second packet to the terminal after receiving the first end identification packet and the second end identification packet.

It should be understood that the target eNB may separately send the buffered first packet and the buffered second packet to the terminal, or may simultaneously send the buffered first packet and the buffered second packet to the terminal. Alternatively, the target eNB may send the buffered first packet to the terminal after receiving the first end identification packet, and send the buffered second packet to the terminal after receiving the second end identification packet.

Operation 416. The target eNB sends a resource release message to the source eNB.

It should be understood that sequence numbers of the foregoing processes do not mean an execution sequence. The execution sequence of the processes should be determined according to functions and internal logic of the processes, and shall not be construed as any limitation the implementation process of this embodiment of the present disclosure.

It should be noted that in the embodiment shown in FIG. 4, the target eNB may further start a timer after sending the path switch request message to the MME or receiving the first end identification packet. When the timer expires, if the target eNB still does not receive the second end identification packet sent by the MEC device through the source eNB, the target eNB sends the buffered first packet and the buffered second packet to the terminal. For details, refer to corresponding content above. Details are not described herein again.

Figure 5:
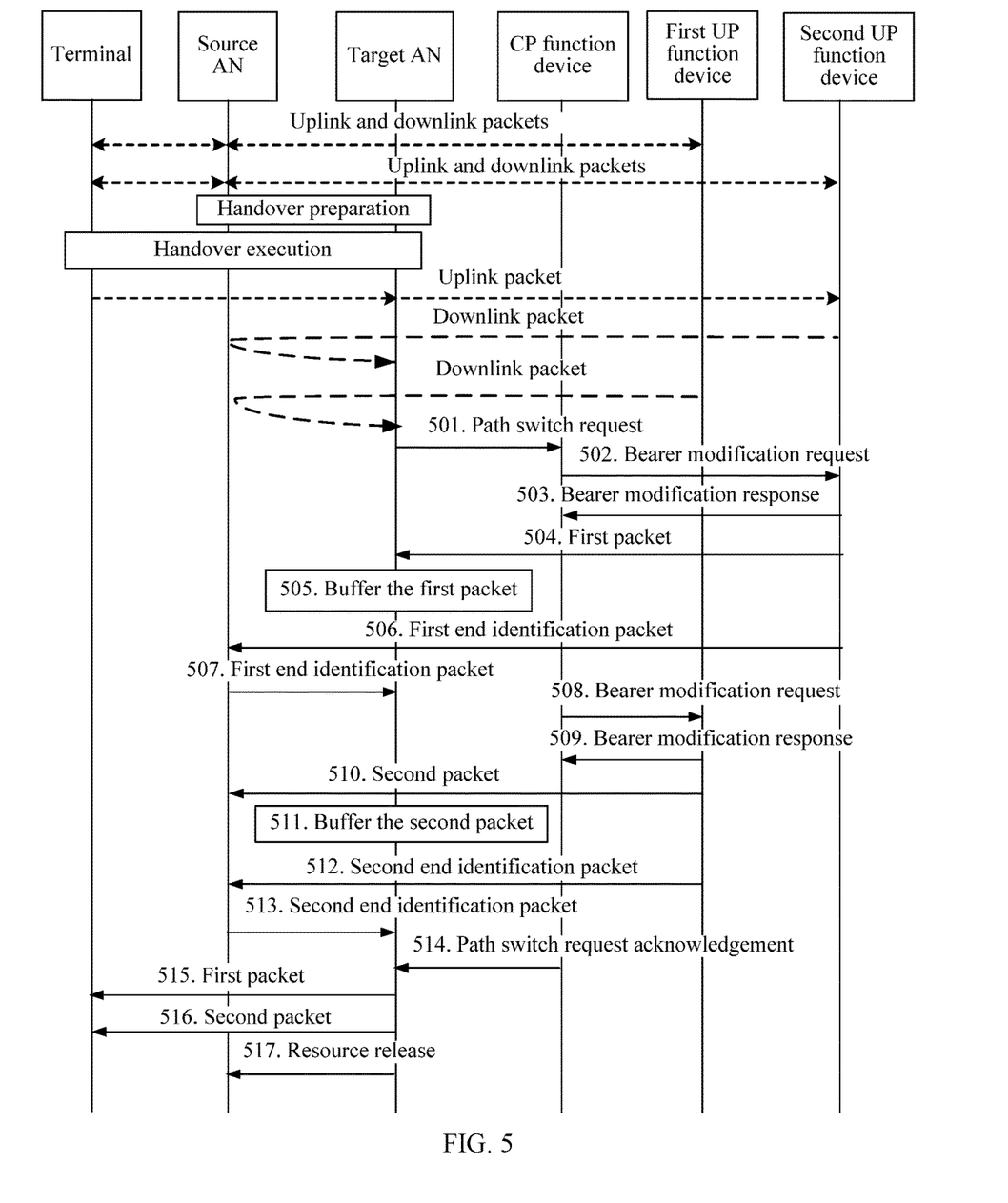
FIG. 5 is a schematic flowchart of another communication method according to an embodiment of the present disclosure.

FIG. 5 is a schematic flowchart of a communication method according to another embodiment of the present disclosure.

For a preparation process of a handover between a source AN and a target AN and an execution process of a handover of a terminal between the source AN and the target AN, refer to the prior art. After the handover of the terminal between the source AN and the target AN is performed, if the source AN receives a packet of the terminal that is sent by a first UP function device or a second UP function device, the packet needs to be sent to the target AN.

To be specific, in this case, a downlink packet reaches the terminal through a data transmission channel 1, and the data transmission channel 1 is: the second UP device--->the source AN--->the target AN--->the terminal; or the packet sent by the first UP device reaches the terminal through a data transmission channel 2, and the data transmission channel 2 is: the first UP device--->the source AN--->the target AN--->the terminal, as shown by dashed lines in FIG. 5.

Operation 501. The target AN sends a path switch request message to a CP function device.

Operation 502. The CP function device sends a bearer modification request message to the second UP function device, where the bearer modification request message indicates that the terminal is handed over from the source AN to the target AN.

Operation 503. The second UP function device sends a bearer modification response message to the CP function device.

Processes 501 to 503 are similar to the prior art. Corresponding content is properly omitted herein.

Operation 504. The second UP function device sends a first packet of the terminal to the target AN.

The second UP function device may learn, based on the received bearer modification request message, that the terminal is handed over from the source AN to the target AN. To be specific, a downlink packet may reach the terminal through a data transmission channel 3 in this case. The data transmission channel 3 is: the second UP function device--->the target AN--->the terminal.

Operation 505. The target AN buffers the first packet.

The target AN may simultaneously receive packets transmitted through the data transmission channel 1 and the data transmission channel 3, and sending time of a packet transmitted through the data transmission channel 1 is earlier. Therefore, a first packet transmitted through the data transmission channel 3 is buffered so that disorder of packets received by the terminal can be avoided.

Operation 506. The second UP function device sends a first end identification packet to the source AN.

Operation 507. The source AN sends the first end identification packet to the target AN, to notify the target AN that transmission of all packets transmitted through the data transmission channel 1 has been completed.

It should be understood that an execution sequence of processes 503, 505, and 506 is not limited. They may be simultaneously performed, or may be performed in any sequence.

Operation 508. The CP function device sends a bearer modification request message to the first UP function device, where the bearer modification request message indicates that the terminal to is handed over from the source AN to the target AN.

In this embodiment of the present disclosure, a control layer interface exists between the CP function device and the first UP function device. Therefore, the CP function device may directly send the bearer modification request message to the first UP function device, to trigger the first UP function device to send an end identification packet.

For example, a bearer modification request may include address information of the target AN and identification information of the terminal device. The identification information of the terminal device is used to indicate a terminal that is handed over. After receiving the bearer modification request message, the first UP function device may change stored address information of the source AN to the address information of the target AN.

It should be noted that a moment at which process 508 is performed is not limited in this embodiment of the present disclosure. Processes 508 and 502 may be simultaneously performed, or process 508 may be performed before or after process 502.

Operation 509. The first UP function device sends a bearer modification response message to the CP function device.

Operation 510. The first UP function device sends a second packet to the target AN.

The first UP function device may learn, based on the received bearer modification request message, that the terminal is handed over from the source AN to the target AN. To be specific, a packet sent by the first UP function device may reach the terminal through a data transmission channel 4 in this case. The data transmission channel 4 is: the first UP function device--->the target AN--->the terminal.

Operation 511. The target AN buffers the second packet.

The target AN may simultaneously receive packets transmitted through the data transmission channel 2 and the data transmission channel 4, and sending time of a packet transmitted through the data transmission channel 2 is earlier. Therefore, a second packet transmitted through the data transmission channel 4 is buffered so that disorder of packets received by the terminal can be avoided.

Operation 512. The first UP function device sends a second end identification packet to the source AN.

Operation 513. The source AN sends the second end identification packet to the target AN, to notify the target AN that transmission of all packets transmitted through the data transmission channel 2 has been completed.

It should be understood that an execution sequence of processes 510 and 512 is not limited. They may be simultaneously performed, or may be performed in any sequence.

Operation 514. The CP sends a path switch request acknowledge message to the target AN.

It should be understood that a moment at which process 514 is performed is not limited in this embodiment of the present disclosure. For example, process 514 may be performed after process 513 or process 503, or may be performed at any moment between process 503 and process 513.

Operation 515. The target AN sends the buffered first packet to the terminal.

Operation 516. The target AN sends the buffered second packet to the terminal.

It should be understood that the target AN may separately send the buffered first packet and the buffered second packet to the terminal, or may simultaneously send the buffered first packet and the buffered second packet to the terminal. Alternatively, the target AN may send the buffered first packet to the terminal after receiving the first end identification packet, and send the buffered second packet to the terminal after receiving the second end identification packet.

Operation 517. The target AN sends a resource release message to the source AN.

It should be understood that sequence numbers of the foregoing processes do not mean an execution sequence. The execution sequence of the processes should be determined according to functions and internal logic of the processes, and shall not be construed as any limitation on the implementation process of this embodiment of the present disclosure.

It should be understood that the eNB or the AN is used as an example to describe an access network device above, but the embodiments of the present disclosure are not limited to standards represented by the terms. The embodiments of the present disclosure may also be applied to another standard. All these modifications fall within the scope of the embodiments of the present disclosure.

It should be noted that in the embodiment shown in FIG. 5, the target AN may further start a timer after sending the path switch request message to the CP function device or receiving the first end identification packet. When the timer expires, if the target AN still does not receive the second end identification packet sent by the first UP function device through the source AN, the target AN sends the buffered first packet and the buffered second packet to the terminal. For details, refer to corresponding content above. Details are not described herein again.

It should be noted that in the embodiments of the present disclosure, the core network device may be the SGW shown in FIG. 4, or may be a gateway device having functions of the SGW and the PGW, or may be the CP function device shown in FIG. 5. The local routing device may be the MEC device shown in FIG. 3, or may be a local user plane function device, namely, the first UP function device shown in FIG. 5.

The foregoing mainly describes the solutions in the embodiments of the present disclosure from a perspective of interaction between devices. It may be understood that, to implement the foregoing functions, each device such as the access network device or the local routing device includes a corresponding hardware structure and/or software module for performing each function. A person skilled in the art should be easily aware that, the units and algorithm operations in the examples described with reference to the embodiments disclosed in this specification may be implemented by hardware or a combination of hardware and computer software. Whether a function is implemented by hardware or in a manner of driving hardware by computer software depends on a particular application and a design constraint condition of the technical solution. A person skilled in the art may use different methods to implement the described functions for each particular application, but it should not be considered that the implementation goes beyond the scope of the present disclosure.

In the embodiments of the present disclosure, functional units of the access network device or the local routing device may be divided according to the foregoing method example. For example, functional units may be divided corresponding to the functions, or two or more functions may be integrated into one processing module. The integrated unit may be implemented in a form of hardware, or may be implemented in a form of a software functional unit. It should be noted that unit division in the embodiments of the present disclosure is an example, and is merely logical function division. There may be another division manner in actual implementation.

Figure 6:
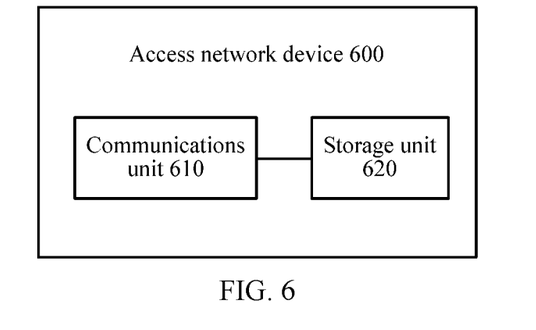
FIG. 6 is a schematic block diagram of an access network device according to an embodiment of the present disclosure.

When an integrated unit is used, FIG. 6 is a possible schematic structural diagram of an access network device in the foregoing embodiments. An access network device 600 includes a communications unit 610 and a storage unit 620. The communications unit 610 is configured to support the access network device in communicating with other network entities, for example, communicating with network entities such as the local routing device, the core network device, and the source access network device shown in FIG. 3, or communicating with network entities such as the SGW and the MEC device shown in FIG. 4, or communicating with network entities such as the CP function device, the first UP function device, and the second UP function device shown in FIG. 5. The storage unit 620 may be configured to buffer a packet received by the communications unit 610. In one embodiment, the storage unit 620 may be further configured to store program code and data of the access network device.

Figure 7:
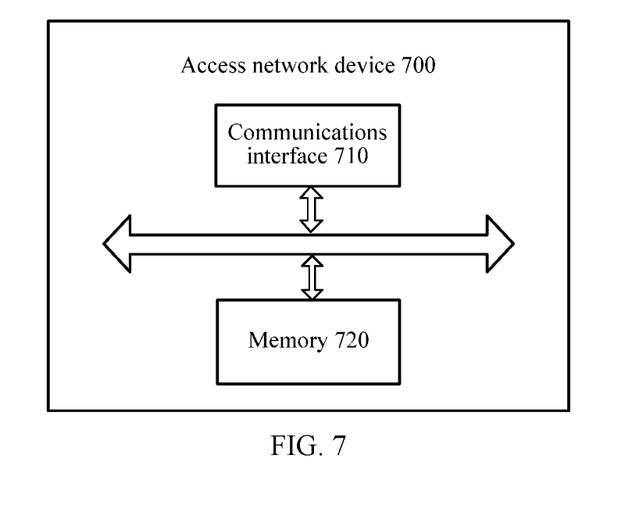
FIG. 7 is a schematic block diagram of another access network device according to an embodiment of the present disclosure.

When the communications unit 610 is a communications interface, and the storage unit 620 is a memory, the access network device in this embodiment of the present disclosure may be an access network device shown in FIG. 7.

Referring to FIG. 7, the access network device 700 includes a communications interface 710 and a memory 720. In one embodiment, the communications interface 710 and the memory 720 may be connected to each other through an internal connection path, to transfer a control and/or data signal.

Figure 8:
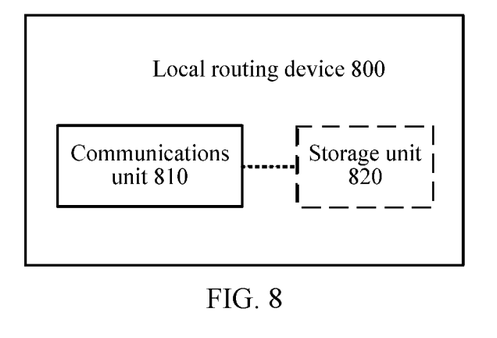
FIG. 8 is a schematic block diagram of a local routing device according to an embodiment of the present disclosure.

FIG. 8 is a possible schematic structural diagram of a local routing device in the foregoing embodiments of the present disclosure. A local routing device 800 includes a communications unit 810. The communications unit 810 is configured to support the local routing device in communicating with other network entities, for example, communicating with the target eNB, the source eNB, the CP function device, and the like shown in FIG. 4 and FIG. 5. The local routing device may further include a storage unit 820, configured to store program code and data of the local routing device.

Figure 9:
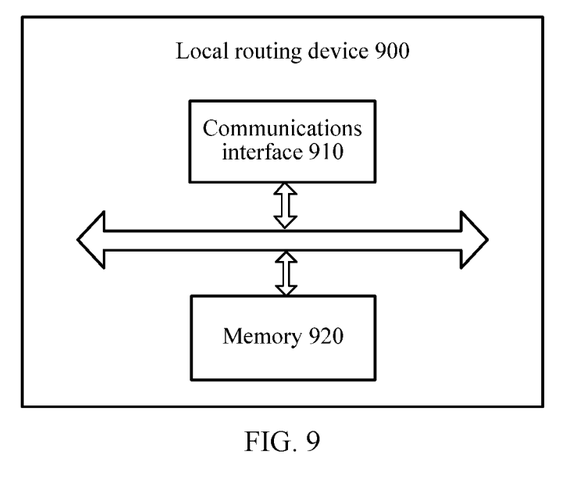
FIG. 9 is a schematic block diagram of another local routing device according to an embodiment of the present disclosure.

When the communications unit 810 is a communications interface, and the storage unit 1030 is a memory, the local routing device in this embodiment of the present disclosure may be a local routing device shown in FIG. 9.

Referring to FIG. 9, the local routing device 900 includes a communications interface 910 and a memory 920.

Methods or algorithm operations described with reference to the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. For example, a storage medium is coupled to a processor, so that the processor can read information from the storage medium, and can write information into the storage medium. Certainly, the storage medium may be a component of the processor.

A person skilled in the art should be aware that in the foregoing one or more examples, functions described in the embodiments of the present disclosure may be implemented by hardware, software, firmware, or any combination thereof. When the present disclosure is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the embodiments of the present disclosure are further described in detail in the foregoing specific implementations. It should be understood that the foregoing descriptions are merely specific implementations of the embodiments of the present disclosure, but are not intended to limit the protection scope of the embodiments of the present disclosure. Any modification, equivalent replacement, or improvement made based on the technical solutions in the embodiments of the present disclosure shall fall within the protection scope of the embodiments of the present disclosure.

What is claimed is:

1. A communication method, comprising:
receiving, by a target access network device, at least one first packet of a terminal when the terminal is handed over from a source access network device to the target access network device;
buffering, by the target access network device, the at least one first packet; and
sending the at least one buffered first packet to the terminal when the target access network device receives a second packet and a third packet from the source access network device, or the target access network device receives one of the second packet and the third packet and does not receive the other one of the second packet and the third packet within a preset period, or the target access network device does not receive the second packet or the third packet within the preset period, wherein the second packet and the third packet are end identification packets, wherein the second packet carries first identification information, and the first identification information is used to identify that the second packet is sent by a core network device; and/or the third packet carries second identification information, and the second identification information is used to identify that the third packet is sent by a local routing device.

2. The method according to claim 1, wherein the first identification information is carried in an end marker of the second packet, and the second identification information is carried in an end marker of the third packet.

3. The method according to claim 1, wherein the method further comprises:
  sending, by the target access network device, a notification message to the local routing device,
  wherein the notification message is used to instruct the local routing device to send the third packet to the source access network device.

4. An access network device, comprising:
  a communications unit, configured to receive at least one first packet of a terminal when the terminal is handed over from a source access network device to the access network device; and
  a storage unit, configured to buffer the at least one first packet received by the communications unit, wherein the communications unit is further configured to send the at least one first packet buffered in the storage unit to the terminal when the communications unit receives a second packet and a third packet from the source access network device, or the communications unit receives one of the second packet and the third packet and does not receive the other one of the second packet and the third packet within a preset period, or the communications unit does not receive the second packet or the third packet within the preset period, wherein the second packet and the third packet are end identification packets, wherein the second packet carries first identification information, and the first identification information is used to identify that the second packet is sent by a core network device; and/or the third packet carries second identification information, and the second identification information is used to identify that the third packet is sent by a local routing device.

5. The access network device according to claim 4, wherein the first identification information is carried in an end marker of the second packet, and the second identification information is carried in an end marker of the third packet.

6. The access network device according to claim 4, wherein the communications unit is further configured to send a notification message to the local routing device, wherein the notification message is used to instruct the local routing device to send the third packet to the source access network device.

\* \* \* \* \*